Patented Feb. 9, 1954

2,668,846

UNITED STATES PATENT OFFICE 2,668,846

O-(4-NITROPHENYL) ALKANEPHOSPHONIC CHLORIDES

Henry Tolkmith, Midland, Mich., assignor to The Dow Chemical Company, Midland, Mich., a corporation of Delaware No Drawing. Application April 21, 1953, Serial No. 350,230

3 Claims. (Cl. 260—461)

The present invention is directed to the O-(4-nitrophenyl) alkanephosphonic chlorides of the formula

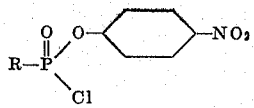

In this and succeeding formulae R represents methyl or ethyl. These compounds are viscous oils, somewhat soluble in many organic solvents and substantially insoluble in water. They are of value as intermediates for the preparation of more complex phosphorus derivatives and as toxic constituents of parasiticide compositions.

The new compounds may be prepared by reacting one molecular proportion of 4-nitrophenol with at least one molecular proportion of an alkanephosphonic dichloride of the formula

in an inert organic solvent such as benzene or diethyl ether. The reaction is carried out in the presence of a hydrogen chloride acceptor such as pyridine.

In carrying out the reaction the 4-nitrophenol and hydrogen chloride acceptor are dispersed in the solvent and the resulting mixture added portionwise with stirring to the alkanephosphonic dichloride dispersed in the same solvent. The mixture is thereafter heated for a period of time at a temperature of from 35° to 80° C. to complete the reaction. The reaction takes place smoothly at the temperature range of from 20° to 80° C. and at a rate which varies directly with the employed temperature. The reaction is somewhat exothermic, temperature being controlled by regulation of the rate of contacting the reactants and by the addition and subtraction of heat, if required. Upon completion of the reaction, the mixture may be filtered and the filtrate distilled under reduced pressure at gradually increasing temperatures to separate low boiling constituents and to obtain as a residue the desired O-(4-nitrophenyl) alkanephosphonic chloride. Distillation temperatures substantially in excess of 150° C. for any appreciable period of time should not be employed as the desired product has a tendency to decompose at such temperature.

In an alternative method, the new compounds may be prepared by reacting one molecular proportion of an alkali metal 4-nitrophenolate with one molecular proportion of the alkanephosphonic dichloride in an inert solvent such as benzene. Of the alkali metal phenolates found useful in the reaction, it is preferred to employ the sodium compound. In carrying out the reaction, the sodium phenolate is added portionwise to the alkanephosphonic dichloride dispersed in the solvent and the resulting mixture heated for a period of time at a temperature of from 30° to 80° C. to complete the reaction. In practice it is sometimes convenient to operate at the boiling temperature of the reaction mixture and under reflux. The conditions of reaction and methods of separation are essentially as previously described.

Example 1.—O-(4-nitrophenyl) methanephosphonic chloride

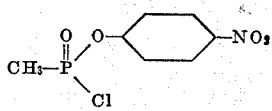

120.5 grams (0.865 mole) of 4-nitrophenol and 76 grams (0.96 mole) of pyridine were dispersed in 1200 milliliters of diethyl ether and the resulting mixture added portionwise with stirring to 350 grams (2.63 moles) of methane phosphonic dichloride (boiling at 163° C. at atmospheric pressure) dispersed in 150 milliliters of diethyl ether. The resulting mixture was thereafter heated for one hour at the boiling temperature and under reflux to complete the reaction. At the end of this period, the mixture was filtered and the filtrate distilled under reduced pressure to a temperature up to 110° C. to obtain as a residue O-(4-nitrophenyl) methane-phosphonic chloride. The latter is a viscous oil having a density of 1.4490 at 20° C.

Example 2.—O-(4-nitrophenyl) ethanephosphonic chloride

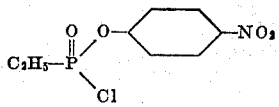

34.5 grams (0.248 mole) of 4-nitrophenol and 22 grams (0.278 mole) of pyridine were dispersed in 350 milliliters of diethyl ether and the resulting mixture added portionwise with stirring to 71 grams (0.483 mole) of ethanephosphonic dichloride (boiling at 175° C. at atmospheric pressure) dispersed in 50 milliliters of diethyl ether. The resulting mixture was thereafter heated for 2 hours at the boiling temperature and under reflux to complete the reaction. At the end of this period, the reaction mixture was filtered and the filtrate distilled under reduced pressure to a temperature up to 110° C. to obtain as a residue O-(4-nitrophenyl) ethanephosphonic chloride. This compound is a viscous oil having a density of 1.4107 at 20° C.

The new O-(4-nitrophenyl) alkane-phosphonic chloride products are effective as parasiticides and adapted to be employed for the control of a wide range of agricultural and household pests such as flies, mites, aphids, beetles and cockroaches. For such use, the compounds may be dispersed on an inert finely divided solid and employed as a dust. Also, such mixtures may be dispersed in water with the aid of a dispersing and wetting agent and the resulting aqueous suspensions employed as sprays. In other procedures, the new products may be employed in oils, as a constituent in oil-in-water emulsions, or in water dispersion with or without the addition of emulsifying, wetting or dispersing agents. Suitable concentrations of the toxicants in dusts are in the order of from about 0.1 to 10 percent by weight of the dust and in liquid suspensions from about 0.1 to 3 pounds per 100 gallons of the spray mixture.

In representative operations against flies and cockroaches, 100 percent kills of these pests are obtained with dust compositions containing 4.5 percent by weight of the toxic alkanephosphonic chlorides.

This is a continuation-in-part of my copending application Serial No. 203,758, filed December 30, 1950.

I claim:

1. O-(4-nitrophenyl) alkanephosphonic chloride of the formula

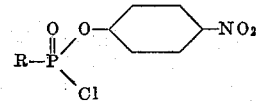

wherein R represents a member of the group consisting of methyl and ethyl.

2. O-(4-nitrophenyl) methanephosphonic chloride.

3. O-(4-nitrophenyl) ethanephosphonic chloride.

HENRY TOLKMITH.

No references cited.